TELEVISION CAMERA PICK-UP EQUIPMENT
Filed July 17, 1967
Fig. 1.
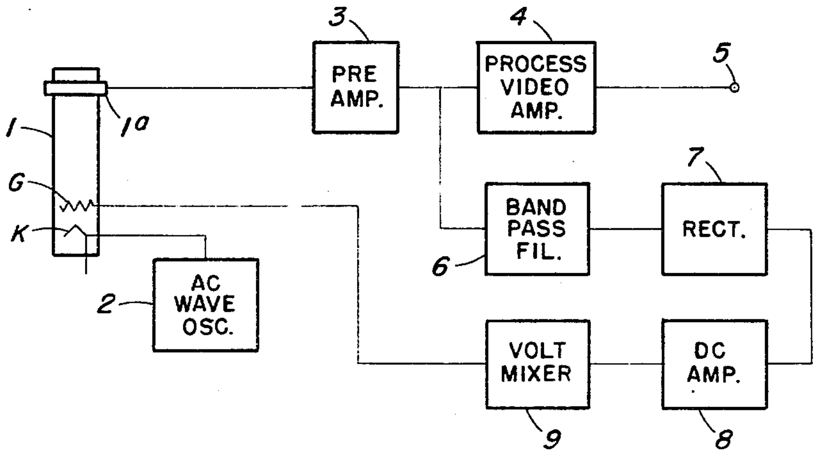
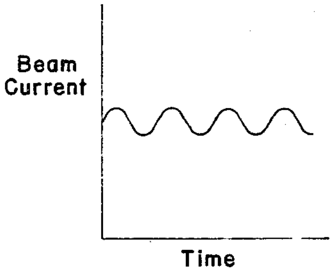
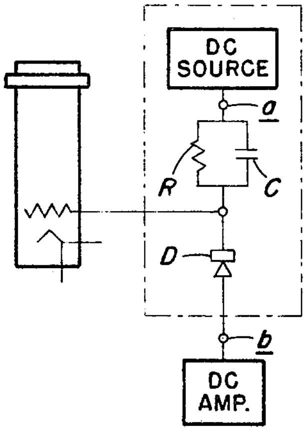
Fig. 2. Fig. 3.
INVENTOR.
Fumio Ando
Marn & Jangarathis
ATTORNEYS 3,495,035
Patented Feb. 10, 1970

3,495,035

TELEVISION CAMERA PICK-UP EQUIPMENT

Fumio Ando, Tokyo, Japan, assignor to Nippon Electric Company Limited, Tokyo, Japan Filed July 17, 1967, Ser. No. 653,959
Int. Cl. H04n *5/38*
U.S. Cl. 178—7.2 11 Claims

ABSTRACT OF THE DISCLOSURE

Television camera pick-up equipment including a pick-up tube having a cathode, a grid, an output electrode and an electron beam current tending to vary in intensity for providing a video signal at the output electrode, and apparatus for automatically maintaining the electron beam current substantially at a predetermined intensity including an AC modulation wave applied to the cathode, rectification of the modulation wave derived from the output electrode, mixing the rectified voltage and a DC voltage of fixed magnitude and polarity to apply a voltage of preselected polarity and varying magnitude to the grid for automatically maintaining the electron beam current at the predetermined intensity.

This invention relates to television camera pick-up equipment of a storage type including a pick-up tube having an electron beam current tending to vary in intensity relative to a predetermined value, and more specifically to an improved arrangement for automatically modulating such electron beam current substantial to maintain the intensity thereof at the predetermined value.

It is well-known in a storage type television pick-up tube that when a two-dimensional charge image stored on a target is scanned with an electron beam current of uniform intensity, either the current discharged from the stored charges on the target as the electron beam hits the target or such residual current in the electron beam current that has not contributed to the discharge of the electron charges on the target is taken out and utilized as the video signal. It has been found in the use of such tube it is a comparatively delicate matter to adjust the intensity of the electron beam current.

If the electron beam current were insufficient, a portion of the electric charges on the target corresponding to the highlight could not be discharged up, and consequently a faithful reproduction of the picture image would be impossible due to the crush of the white peaks of the video signal. If the beam current were excessive, the beam aperture becomes large, and the resolution of the picture image would become poor and the picture image would be distorted geometrically. Furthermore, if a pick-up tube such as an image orthicon were used the *S/N* ratio would decrease as it is known.

In a conventional television camera, the adjustment of the electron beam current of a pick-up tube has been carried out manually in the following way. When the beam current is gradually increased from zero, the darkest portion of the picture image is at first fully reproduced. While watching the picture image, the beam current is more increased until the highlight portions of the image have been fully reproduced. However, the position where the electric charges of the image highlight have just been discharged up will move due to the change in the brightness of the highlight entering the pick-up tube, in the temperature on the target surface particularly in a pick-up tube such as a vidicon, or in the voltage applied to the electrodes of the pick-up tube. Therefore, it has been required for an operator of the camera always to watch the reproducing picture image and to control the beam current so as not to be excessive or insufficient, or to make the somewhat excessive beam current flow with an important view to avoiding the crush of white peaks.

The present invention serves to remove th problem of manually adjusting the intensity of the electron beam and at the same time to provide automatic detection of the shortage in the intensity of the electron beam current and control of the supply of a proper amount thereof.

The principle of the present invention is readily understood from the following description taken together with the accompanying drawing in which:

FIG. 1 shows a television camera adapted to include a specific embodiment of the invention in a box diagram form;

FIG. 2 is a waveform provided in FIG. 1; and

FIG. 3 is a circuit diagram of a declining voltage mixed usable in FIG. 1.

FIG. 1 illustrates a pick-up television camera equipment including a pick-up tube 1 having at least a cathode K, a grid G, an output electrode 1*a*, and an electron beam (not shown) tending to vary in current intensity for producing a video signal, and an output terminal 5 for the latter signal.

A specific embodiment of the present invention for automatically controlling the current intensity of an electron beam in a television camera pick-up tube comprises a modulation wave oscillator 2 connected to the cathode, a preamplifier 3 connected to the output electrode, a process amplifier 4 interposed between the preamplifier output and the video output terminal, a filter 6 also connected to the preamplifier output, a rectifier 7 connected to the filter output, a direct current amplifier 8 connected to the rectifier output, and a declining voltage mixer 9 interposed between the rectified voltage amplifier output and the grid of the tube. An ordinary television camera also comprises a deflection amplifier, a high-voltage generating device, and the like all of which are omitted herein because they have no direct relation to the principle of the present invention.

When beam current which as shown in FIG. 2 is a super-position of an alternating current wave on a direct current is used for a storage type television pick-up tube, or more particularly when the beam current is shallowly modulated with an alternating current and the direct current is properly adjusted, a part of the video signal obtained from the output electrode of the pick-up tube will be modulated with the alternating current. This phenomenon can be explained as follows. The video signal is due to the discharging current of the electric charges stored on the target in the pick-up tube. When the beam current is insufficient, the stored charges can not be discharged up, and the video signal obtained is nearly proportional to the intensity of the beam current. When the intensity of the beam current becomes excessive, no video signal corresponding to the excessive portion of the beam current will be obtained, but the output level depends on the amount of electric charge stored in the target and accordingly on the amount of the intensity of the incident light.

Consequently, an application of this phenomenon makes it possible, inasmuch as the modulation wave will appear at the portions corresponding to the highlight of the video signal while the intensity of the beam current is insufficient, to know if the intensity of the beam current is insufficient or not according to the detection for the presence of the modulation wave modulating the intensity of the beam current in the video signal. The modulation wave modulating the intensity of the beam current may have any frequency, but the latter is desirably outside the video frequency band to prevent any mis-operation owing to the same frequency component contained in the video signal or any disturbance caused to the reproduced picture by the modulation wave.

When, for example, 20 mc./s. is selected as the frequency of the modulation wave where the frequency band width of the video signal is 7 mc./s., as usual, the modulation wave is not perceived at the receiving device because the modulation wave does not interfere with the video signal and is higher in frequency than the upper bandwidth limit of the resolution of the reproduced picture image.

Based on the above discussed principle, the operation of the means for automatically controlling the intensity of the beam current is hereinafter explained by reference to the specific embodiment of the present invention shown in FIG. 1 as previously mentioned. The alternating current wave supplied by the oscillator is applied to the cathode to modulate the intensity of the beam current. If the beam current is insufficient, the modulation wave will appear in the video signal at the output electrode of the pick-up tube as above mentioned. For the convenience of the present description, the modulation wave is applied to the cathode; and it is understood that the modulation may be alternatively applied to one of the other electrodes which is capable of controlling the intensity of the beam current, e.g., the first grid G or the second grid, not shown.

The video signal and the modulation wave obtained from the output electrode of the pick-up tube are amplified in the preamplifier; and one portion of the preamplifier output is supplied to the input of the process amplifier whose output is connected to the video signal output terminal. Another portion of the preamplifier output is supplied to the band pass filter which passes the modulation wave but attenuates the video signal. Obviously, the preamplifier has a bandwidth wide enough to amplify both the video signal and modulation wave. Inasmuch as the process amplifier usually has a frequency bandwidth necessary to amplify only the video signal, the modulation wave, if it is provided with a frequency outside the video signal bandwidth as above noted, is attenuated in the latter amplifier. As a consequence, the modulation wave does not appear at the video signal output terminal. Furthermore, in case the modulation wave would have an adverse influence on the video signal, a filter, not shown, may be provided at the video signal output terminal to attenuate the modulation wave thereat.

The band pass filter transmits the modulation wave which is rectified in the rectifier, and the rectified voltage is amplified by the direct current amplifier to a desired value. The amplified rectified voltage is applied to the input of the declining voltage mixer whose output is applied to the grid to increase the intensity of the beam current. For the convenience of the explanation here, the mixer output is supplied to the grid; and it is understood that a similar control of the intensity of the electron beam current may be obtained when the mixer output is alternatively applied to on of the other tube electrodes which is capable of controlling the intensity of the electron beam current, e.g., the cathode. However, in the latter case it is necessary to reverse the polarity of the mixer output voltage and to adjust the value thereof.

The voltage mixer in FIG. 3 serves to decline or decrease slowly the intensity of the beam current which at the moment may be excessive. Resistor R, capacitor C and diode D having an anode and a cathode individually comprise well-known structures. Point *a* in FIG. 3 is connected to a potential source, not shown, providing a potential which is sufficiently negative with regard to the tube cathode K and is fixed so as to cut off the beam current when the grid potential becomes equal to the potential at point *a*. Point *b* in FIG. 3 is connected to the output of the rectified current amplifier. The potential at point *b* is designed to cut off the electron beam or to make the latter insufficient when no modulation wave is present in the video signal available at the output electrode and to make the intensity of the beam current sufficient when the modulation wave is present in the video signal available at the output electrode.

An insufficiency of the intensity of the electron beam current raises the potential at point *b* with regard to point *a* sufficiently high with a positive polarity to cause the diode to conduct and thereby to make the potential at the grid nearly equal to the potential *b*. Consequently, when the intensity of the beam current increases and the insufficiently thereof is corrected, the potential at point *b* is decreased to make the intensity of the electron beam current insufficient again. However, the grid potential will not immediately become equal to the potential at point *b* but will descend or decrease slowly because the charge stored in capacitor C, according to the time constant of the RC circuit, and the diode will not conduct until the grid potential becomes equal to the potential at point *b*. Consequently by such action of the mixer circuit, the intensity of the electron beam current declines or decreases automatically to prevent an excess in the intensity thereof; and when the intensity of the electron beam current is short or insufficient, the output of the rectified current amplifier increases the potential at point *b* to cause an increase in the intensity of the electron beam current. Therefore, the intensity of the electron beam current is always maintained automatically at the predetermined value, neither more nor less.

The time constant of the RC circuit is to decide the declining or decreasing time of the electron beam intensity; and such time constant is usually determined to be sufficiently long compared with a frame period of the television camera. Thus, the present invention automatically maintains the intensity of the electron beam of the pick-up tube at an optimum value, and renders needless the manual adjustments of the intensity of the electron beam current every time for changes in the brightness of the illuminated targets, variations in the temperature of the target surface, and changes in the voltages applied to the several electrodes of the pick-up tube. This also enables the present invention to improve the quality of the television picture.

It is understood that the invention herein is described in specific respects for the purpose of this description. It is also understood that such respects are merely illustrative of the application of the principle of the invention. Numerous other arrangements may be devised by those skilled in the art without departing from the spirit and scope of the invention.

What is claimed is:

1. Television pick-up camera equipment comprising:

an electron pick-up tube including at least a cathode, a grid, an output electrode and an electron beam current tending to vary in intensity relative to a predetermined value for producing a video signal extending over a preselected frequency band and available at said output electrode;

an output terminal for said video signal;

means for applying said video signal derived from output electrode to said output terminal;

and means for automatically maintaining the intensity of said electron beam current substantially at said predetermined value, comprising:

means for applying an alternating current wave to a preselected one of said cathode and grid to modulate the current intensity of said electron beam, said alternating current wave appearing together with said video signal at said output electrode in correspondence with the intensity variations of said electron beam current;

means for rectifying said modulation wave derived from said output electrode to provide a rectified voltage varying in magnitude from zero to a predetermined value in correspondence with the variations of said alternating current wave from zero to a predetermined value at said output electrode;

and means for automatically utilizing said rectified voltage of varying magnitude to vary correspondingly the magnitude of the rectified voltage applied to a preselected one of said cathode and grid to modulate the intensity of said electron beam current to maintain said last-mentioned current substantially of said predetermined value thereof.

2. The television equipment according to claim 1 in which said alternating current wave applied to said preselected one of said cathode and grid has a frequency outside said preselected video frequency band.

3. The television equipment according to claim 1 in which said cathode is preselected to have said alternating current means to apply said alternating current wave thereto.

4. The television equipment according to claim 1 in which said grid is preselected to have said alternating current wave means to apply said alternating current wave thereto.

5. The television equipment according to claim 1 in which said cathode is preselected to have said utilizing means to apply the rectified voltage of varying magnitude thereto.

6. The television equipment according to claim 1 in which said grid is preselected to have said utilizing means to apply the rectified of varying magnitude thereto.

7. The television equipment according to claim 1 in which said utilizing means includes a voltage mixing circuit comprising:

a source of direct voltage of preselected magnitude and polarity;

a resistor and a capacitor, said resistor and capacitor having corresponding terminals connected to said last-mentioned source;

a unidirectional device having an anode connected to other corresponding terminals of said resistor and capacitor and a cathode connected to the output of said rectifying means;

and a point common to said anode and other corresponding resistor and capacitor terminals connected to said preselected one of said cathode and grid.

8. The television equipment according to claim 7 in which said capacitor is charged by said rectified voltage as said last-mentioned voltage is utilized to vary the magnitude of the voltage applied to said preselected one of said cathode and grid in correspondence with the last-mentioned voltage magnitude variations, said capacitor voltage charge as said capacitor discharges serving to gradually reduce the magnitude of the voltage applied to said preselected one of said cathode and grid and at the same time to gradually reduce the intensity of said electron beam current.

9. The television equipment according to claim 7 in which said cathode is preselected to have said common point connected thereto.

10. The television equipment according to claim 7 in which said grid is preselected to have said common point connected thereto.

11. Television pick-up camera equipment comprising:

a storage pick-up tube including at least a cathode, a grid, an output electrode and an electron beam current tending to vary in intensity relative to a predetermined value for producing a video signal extending over a preselected frequency band and available at said output electrode;

an output terminal for said video signal;

means for applying said video signal derived from said output electrode to said output terminal;

and means for automatically maintaining the intensity of said electron beam current substantially at said predetermined value, comprising:

means for applying an alternating current wave to said cathode to modulate the current intensity of said electon beam, said alternating current wave appearing together with said video signal at said output electrode in correspondence with the intensity variations of said electron beam current;

means for rectifying said modulation wave derived from said output electrode to provide a rectified voltage varying in magnitude from zero to a predetermined value in correspondence with the variations of said last-mentioned modulation wave from zero to a predetermined value at said output electrode;

and means for automatically utilizing said rectified voltage of varying magnitude from zero to said predetermined value to vary correspondingly the magnitude of the voltage applied to said grid to modulate the intensity of said electron beam current to maintain said last-mentioned current intensity substantially said predetermined value thereof, comprising:

voltage mixing means including, a source of direct current voltage of preselected magnitude and polarity, a resistor and a capacitor, said resistor and capacitor having corresponding terminals connected to said last-mentioned source, a unidirectional device having an anode connected to other corresponding terminals of said resistor and capacitor and a cathode connected to the output of said rectifying means, and a point common to said anode and other corresponding resistor and capacitor terminals connected to said grid.

References Cited

UNITED STATES PATENTS

| | | | |
|---|---|---|---|
| 3,046,333 | 7/1962 | Gebel | 178—7.2 |
| 3,437,749 | 4/1969 | Klem | 178—7.2 |

JOHN W. CALDWELL, Primary Examiner

ALFRED H. EDDLEMAN, Assistant Examiner

UNITED STATES PATENT OFFICE

CERTIFICATE OF CORRECTION

Patent No. 3,495,035 February 10, 1970

Fumio Ando

It is certified that error appears in the above identified patent and that said Letters Patent are hereby corrected as shown below:

Column 1, line 5, after "Ser. No. 653,959" insert as a new line -- Claims priority, application Japan, July 19, 1966, 47226/1966 --, and line 31, "substantial" should read -- substantially --. Column 2, line 3, "th" should read -- the --. Column 3, line 54, "on" should read -- one --.

Signed and sealed this 15th day of September 1970.

(SEAL)
Attest:

Edward M. Fletcher, Jr.
Attesting Officer

WILLIAM E. SCHUYLER, JR.
Commissioner of Patents